United States Patent
Murayama et al.

[11] Patent Number: 5,829,701
[45] Date of Patent: Nov. 3, 1998

[54] DOUBLE-BEARING FISHING REEL WITH FINGER PLACING MEMBERS

[75] Inventors: Tomohiro Murayama; Toshiro Ono, both of Tokyo; Shinichi Asano, Chiba, all of Japan

[73] Assignee: Daiwa Seiko, Inc., Tokyo, Japan

[21] Appl. No.: 763,835

[22] Filed: Dec. 12, 1996

[30] Foreign Application Priority Data

Dec. 13, 1995 [JP] Japan .................................. 7-324629

[51] Int. Cl.$^6$ ................................................ A01K 89/015
[52] U.S. Cl. ........................................ 242/310; D22/140
[58] Field of Search ............................. 242/310; D22/140

[56] References Cited

U.S. PATENT DOCUMENTS

| D. 326,306 | 5/1992 | Sakurai ................................... D22/140 |
| D. 326,307 | 5/1992 | Sakurai ................................... D22/140 |
| D. 351,451 | 10/1994 | Storz ....................................... D22/140 |
| D. 366,690 | 1/1996 | Storz ....................................... D22/140 |
| D. 369,642 | 5/1996 | Iwabuchi ................................. D22/140 |
| 4,821,978 | 4/1989 | Kaneko ................................. 242/84.1 R |
| 5,127,603 | 7/1992 | Morimoto ................................. 242/310 |
| 5,183,221 | 2/1993 | Kawai et al. ............................. 242/310 |
| 5,308,019 | 5/1994 | Karlsson ................................. 242/310 |

FOREIGN PATENT DOCUMENTS

| 0 698343 | 2/1996 | European Pat. Off. . |
| 4-21262 | 2/1992 | Japan . |
| 4-117576 | 10/1992 | Japan . |
| 8154546 | 6/1996 | Japan . |

*Primary Examiner*—Katherine Matecki
*Attorney, Agent, or Firm*—Sughrue, Mion, Zinn, Macpeak & Seas, PLLC

[57] ABSTRACT

In a double-bearing type fishing reel, a front finger-placing section (50) is provided between the side boards (2a, 2b) of the reel body (1) above the spool (3) in such a manner that, when an angler grips the reel body (1), the thick part of the end portion of the thumb abuts against the front finger-placing section. A rear finger-placing section (55) is provided between the side boards (2a, 2b) of the reel body (1) behind the spool (3) in such a manner that the base of the thumb abuts against the rear finger-placing section (55). The double-bearing type fishing reel is exhibits an improved reel gripping characteristic.

20 Claims, 4 Drawing Sheets

DOUBLE-BEARING FISHING REEL WITH FINGER PLACING MEMBERS

BACKGROUND OF THE INVENTION

This invention relates to a double-bearing type fishing reel.

In a conventional double-bearing type fishing reel, the spool is rotatably supported between the side boards of the reel body. A finger placing member is provided between the side boards of the reel body so that, when, during fishing, the angler grips the side board opposite to the side board where the handle is provided, he can place his thumb on it (cf. Japanese Utility Patent (OPI) No. 21262/1992 and No. 117576/1992 (the term "OPI" as used herein means an "unexamined published application")).

With the above-described conventional double-bearing type fishing reel, the side board opposite to the side board where the handle is provided is gripped during fishing. In this case, the angler grips the side board opposite to the side board where the handle is provided, with his thumb abutted against the aforementioned finger placing member. However, the conventional double-bearing type fishing reel is not designed with the reel gripping characteristic taken into account. Hence, merely with the thumb placed on the finger placing member, it is impossible for the angler to grip the whole reel sufficiently deep in the hand. Hence, the reel body is gripped with the holding force of the finger tip, which is strenuous, and does not allow for a comfortable swing of the wrist in the snapping operation for setting the hook.

Hence, when a fish takes the hook, it is rather difficult for the angler to strike the fish quickly with the snap of the wrist. On the other hand, as was described above, the angler is unable to grip the reel body sufficiently deeply in the palm. Hence, when the fishing line is taken up or let out (in a casting operation), the conventional double-bearing type fishing reel is low in operability.

SUMMARY OF THE INVENTION

Accordingly, an object of this invention is to provide a double-bearing type fishing reel which is improved in reel gripping characteristic.

What is provided by the invention is a novel double-bearing type fishing reel. A specific feature of the fishing reel of the invention resides in the configuration of the finger placing section on which the thumb is placed and/or the configuration of the side board of the fishing reel that lies opposite to the side board where the handle is provided, in order to enable an angler to grip the entire reel sufficiently deep within the hand.

More specifically, in the double-bearing type fishing reel of the invention, a front finger-placing section is provided between the side boards of the reel body above the spool in such a manner that, when an angler grips the reel body, the thick part of the end portion of the thumb of the angler abuts against the front finger-placing section, and a rear finger-placing section is provided between the side boards of the reel body behind the spool in such a manner that the base of the thumb abuts against the rear finger-placing section. This feature makes it possible for the angler to positively grip the reel body deep with the palm by sufficiently utilizing the base region and the thenar region of the thumb.

Furthermore, in the double-bearing type fishing reel of the invention, one of the side boards which is opposite to the other side board where the handle is provided is so tapered that the side board gradually decreases in height towards the rear end from the spool mounting region and/or the outer surface of the one side board is inclined backwardly, towards the other side board from the spool mounting region. This feature makes it possible for the angler to deeply and securely grip the whole reel body such that the palm encloses the whole reel body.

DETAILED DESCRIPTION OF THE PREFERRED EMBODIMENTS

The invention will be concretely described with reference to a double-bearing type fishing reel (hereinafter "fishing real ") of the type in which the traverse shaft of a level winding device is provided behind the spool, as proposed in Japanese Patent Application No. 75671/1995. However, the invention is not limited thereto or thereby; that is, the technical concept of the invention may be applied to a variety of double-bearing type fishing reels.

FIGS. 1–5 show, by means of various views, the structure and external appearance of a fishing reel in accordance with one embodiment of the invention. Right and left sides boards 2b and 2a are coupled to the frame 1a of a reel body 1 (the side board 2a being on the side of the fishing reel where a handle 7 is provided, and the side board 2b being on the side which is opposite to the one side). A spool shaft 3a, on which a spool 3 is mounted, is rotatably supported through bearings between the right and left side boards 2b and 2a. A pinion 5 is axially slidably mounted on one end portion of the spool shaft 3a and engaged with a drive gear 9 which is mounted on the shaft 7a of the handle 7 (hereinafter referred to as "a handle shaft 7a", when applicable). Hence, as the handle 7 is turned, the spool 3 is rotated through the drive gear 9 and the pinion 5.

The pinion 5 has an annular groove, with which a clutch board 10 is engaged. The clutch board 10 axially slides by the operation of a clutch change-over lever 13 which protrudes from the surface of the frame 1a on the side of the side board 2a. Hence, the aforementioned pinion 5 is axially slid. As the pinion 5 axially slides, the torque of the handle 7 is transmitted to the spool 3 ("clutch on"; the fishing line is taken up), or the transmission of the torque is interrupted ("clutch off"; the fishing line is let out). A clutch mechanism of this type is well known in the art. The mounting position of the clutch change-over lever, and the operating direction can be changed variously. In the embodiment, in order that the clutch change-over operation can be achieved with the reel body gripped, the clutch change-over lever is so arranged that it is able to slide back and forth near the position where the thumb is located.

A drive shaft 15 of a level winding device has a traverse groove in the outer cylindrical surface thereof (hereinafter referred to as "a traverse shaft 15", when applicable) and is rotatably supported between the right and left side boards 2b and 2a behind the spool (on the side which is opposite to the side towards which the fishing line is let out). A gear (not shown) is mounted on the end portion (on the handle side) of the traverse shaft 15 in such a manner that the gear is engaged with the drive gear 9 mounted on the aforementioned handle shaft 7a. Hence, the traverse shaft 15 is turned by the rotation of the handle 7. The traverse shaft 15 is accommodated in a guide cylinder 20 which is provided between the right and left side boards 2b and 2a. The guide cylinder 20 has an elongated hole which extends axially. That is, the traverse shaft 15 is turned inside the guide cylinder 20.

A drive body 22 is provided outside the guide cylinder 20 in such a manner that it surrounds the latter 20 and is axially movable. The drive body 22 includes an engaging piece which extends through the elongated hole formed in the guide cylinder 20 to engage with the traverse groove of the traverse shaft 15. Hence, as the traverse shaft 15 is turned, the drive body 22 is moved right and left along the axis.

A rod mounting section 30 which secures the reel body 1 to the fishing rod is provided between the right and left side boards 2b and 2a below the spool 3. Below the spool 3, the central portion of an operating body 33 is pivotally supported on the rod mounting section 30 by a collar 35 and a supporting shaft 37 arranged inside the collar 35. The operating body 33 is in the form of an elongated plate which extends across the spool 3 and is bent to be substantially U-shaped. The rear end portion of the operating body 33 engages with the aforementioned drive body 22, and the front end portion is coupled to a fishing line guide 40 having a fishing line guide hole 41 through which the fishing line passes. The fishing line guide 40 is supported by a guide shaft 45 connected between the right and left side boards 2b and 2a so that it can be stably moved right and left.

When, the handle of the fishing reel thus constructed is turned, the spool 3 is rotated, while the traverse shaft 15 is also rotated. As the traverse shaft 15 rotates in this manner, the drive body 22 reciprocates along the traverse shaft, so that the operating body 33 coupled to the operating body 33 swings through a predetermined angle about the supporting shaft 37. As the operating body 33 swings, the fishing line guide 40 reciprocates along the guide shaft 45, whereby the fishing line S is wound in parallel turns, evenly onto the spool 3. According to the design illustrated, the spool shaft 3a is located towards the front end of the reel body 1 and the handle shaft 7a is located behind the spool shaft 3a.

A front finger-placing section 50, on which the thick part of the thumb can be placed when the reel body is gripped with the hand, is provided between the right and left side boards 2b and 2a of the reel body 1 and above the spool 3. In addition, a rear finger-placing section 55, on which the base of the thumb can be placed when the angler grips the reel body with the thick part of the thumb placed on the front finger-placing section 50, is provided between the right and left side boards 2b and 2a of the reel body 1 and behind the spool 3. As evident from the figures, the spool is placed relatively far forward in the fishing reel. Specifically, in FIG. 2, reference character O designates the location on the right side board 2b of the rotational axis of the spool 3. If a line segment S, measuring the length of the side board 2b, is drawn to pass through the axis O and intersect, e.g., the rear extremity of the right side board 2b, it can be seen from FIG. 2 that the spool axis O lies in front of a midpoint M of the line segment S. By placing the spool 3 relatively far forward in the reel and arranging the front finger-placing section 50 generally above the spool 3, a firm, deep hold on the reel body 1 is ensured. As was described above, the finger-placing sections 50 and 55, on which the thumb can be placed, are provided between the right and left side boards 2b and 2a. Hence, the reel body 1 can be gripped by using the part of the thumb which extends from the base region to the thenar region of the thumb. That is, the reel body is positively held near the position of swing of the wrist in the snap action. Hence, when a fish takes the hook, the angler can stably strike the fish with a snap of the wrist. Furthermore, since the reel body is held stably, the fishing reel is high in operability when the fishing line is taken up or let out. In the embodiment shown in the figures, the front finger-placing section 50 is provided above the spool 3 and considerably ahead of the spool. This design is suitable for a small fishing reel, and the reel body can be gripped deeply with the palm.

An opening provided between the front finger-placing section 50 and the rear finger-placing section 55 is utilized as follows: That is, through the opening, the thumb is pressed against the spool 3, on which the fishing line is wound, to brake the spool; or through the opening, the fishing line is controlled when backlash occurs with the spool. The front finger-placing section 50 and the rear finger-placing section 55 are not particularly limited in configuration; however, it is preferable that they are shaped as follows: In practice, when the reel body is gripped deep with the thumb placed on the front finger-placing section 50 and the rear finger-placing section 55, the tip end of the thumb is inclined towards the handle as indicated by the two-dot chain lines in FIG. 1. Hence, it is preferable that the front finger-placing section 50 and the rear finger-placing section 55 are so shaped that the thumb can be readily placed on the line P in FIG. 1.

Figure 3:
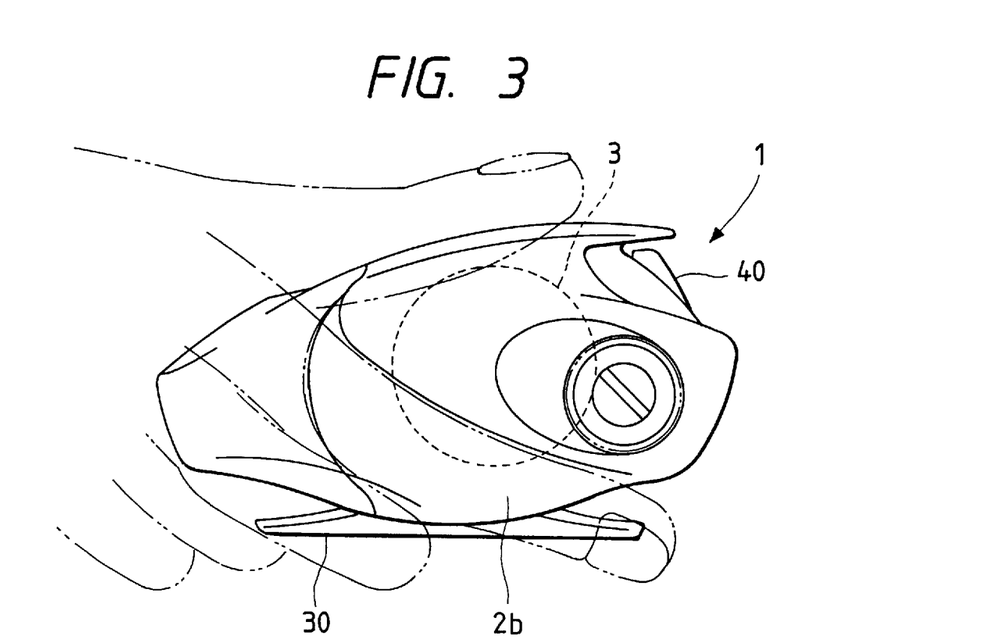
FIG. 3 is a side view of the double-bearing type fishing reel shown in FIG. 1, showing how the latter is gripped by the hand of the angler.

And when the thumb is laid on the front finger-placing section 50 and the rear finger-placing section 55, the thick part of the thumb, which extends from the tip end to the base of the thumb, is arcuate as indicated by the two-dot chain line in FIG. 3. Hence, it is preferable that the inner portions of the front finger-placing section 50 and the rear finger-placing section 50 are formed into thumb holding portions 50a and 55a, respectively, which are inclined inwardly in correspondence to the arcuate thick part of the thumb. With the aid of the thumb holding portions 50a and 55a, the thumb is stably positioned; that is, the reel body is improved in reel holding characteristic.

Figure 1:
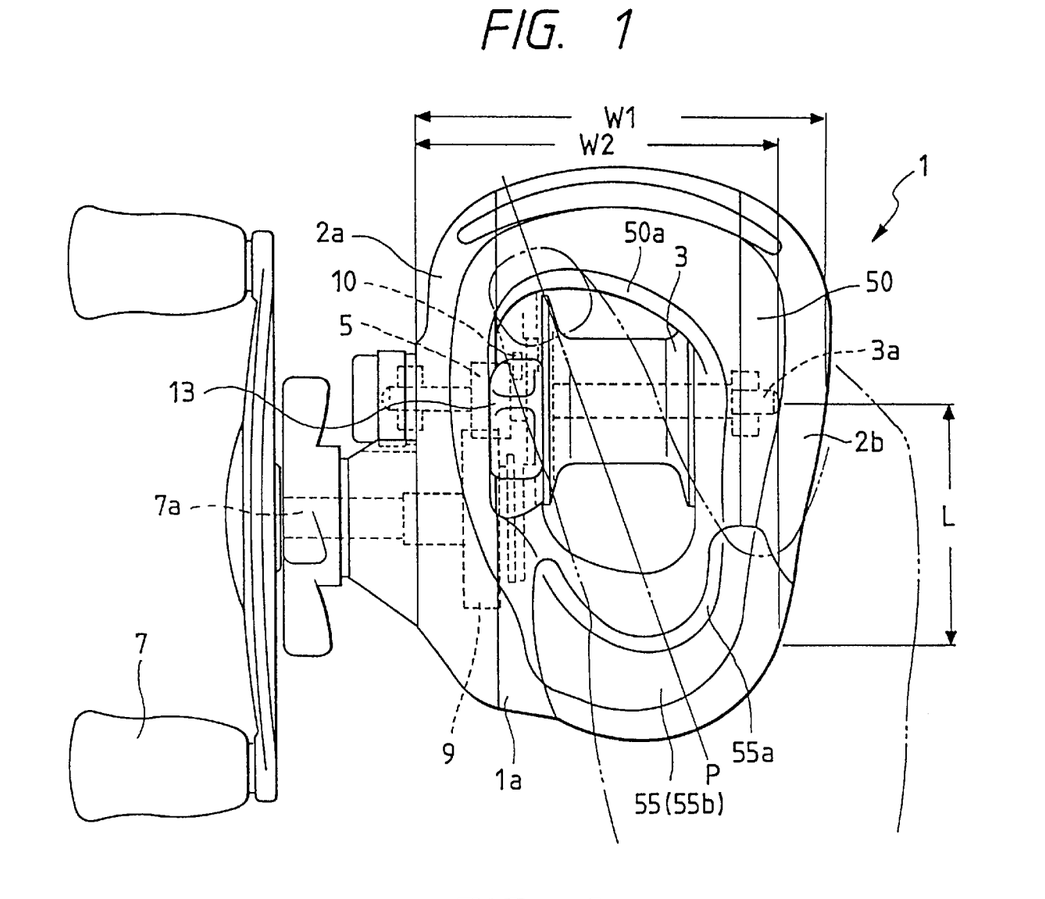
FIG. 1 is a plan view showing the structure of a double-bearing type fishing reel, which constitutes a preferred embodiment of the invention.

In order to facilitate the reel assembling work, it is preferable that front finger-placing section 50 (including the thumb holding portion 50a) and the rear finger-placing section 55 (including the thumb holding portion 55a) are formed integral with the frame 1a of the reel body 1. The side board 2a (on the handle side) and the side board 2b (on the opposite side) are coupled to the frame 1a and thus to the front finger-placing section 50 and the rear finger-placing section 55, as shown in FIG. 1. However, it should be noted that, in order that, whenever backlash of the spool occurs, the fishing line may be controlled, the side board 2b (on the opposite side) is so designed that it is removable from the frame 1a with ease.

In the embodiment, the rear finger-placing section 55 formed in the frame 1a is somewhat curved downwardly so that a finger placing cover 55b is placed thereon. The finger placing cover 55b is made of a soft material such as soft resin and rubber material. With the finger placing cover 55b thus placed, the angler feels the thumb fitted well on the reel.

In the embodiment, in order to hold the whole reel body deep with the palm, the side board 2b (on the side opposite to the side where the handle is provided (hereinafter referred to as "the opposite side", when applicable)) is designed particularly in configuration. Hence, the fishing reel is further improved in reel gripping characteristic.

Figure 2:
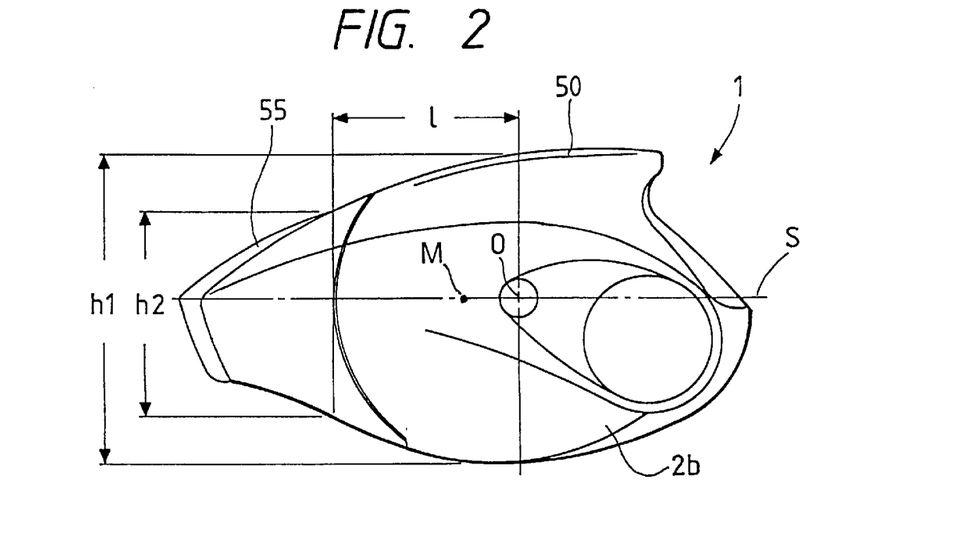
FIG. 2 is a side view of the double-bearing type fishing reel shown in FIG. 1.
Figure 4:
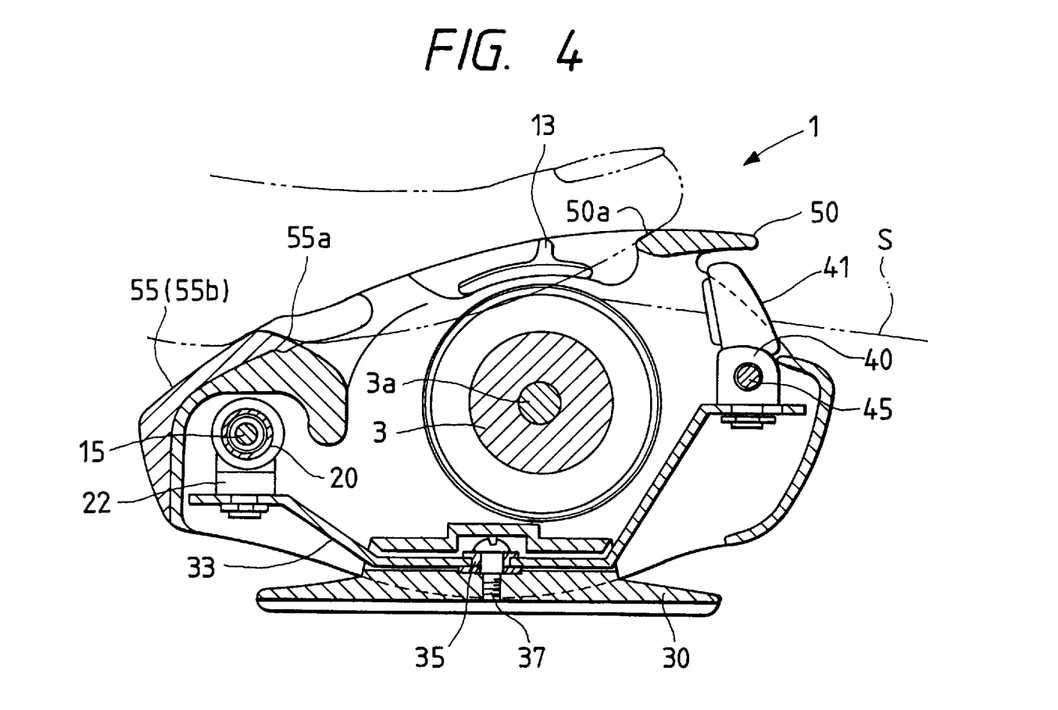
FIG. 4 is a sectional view, with parts cut away, illustrating the double-bearing type fishing reel shown in FIG. 1.
Figure 5:
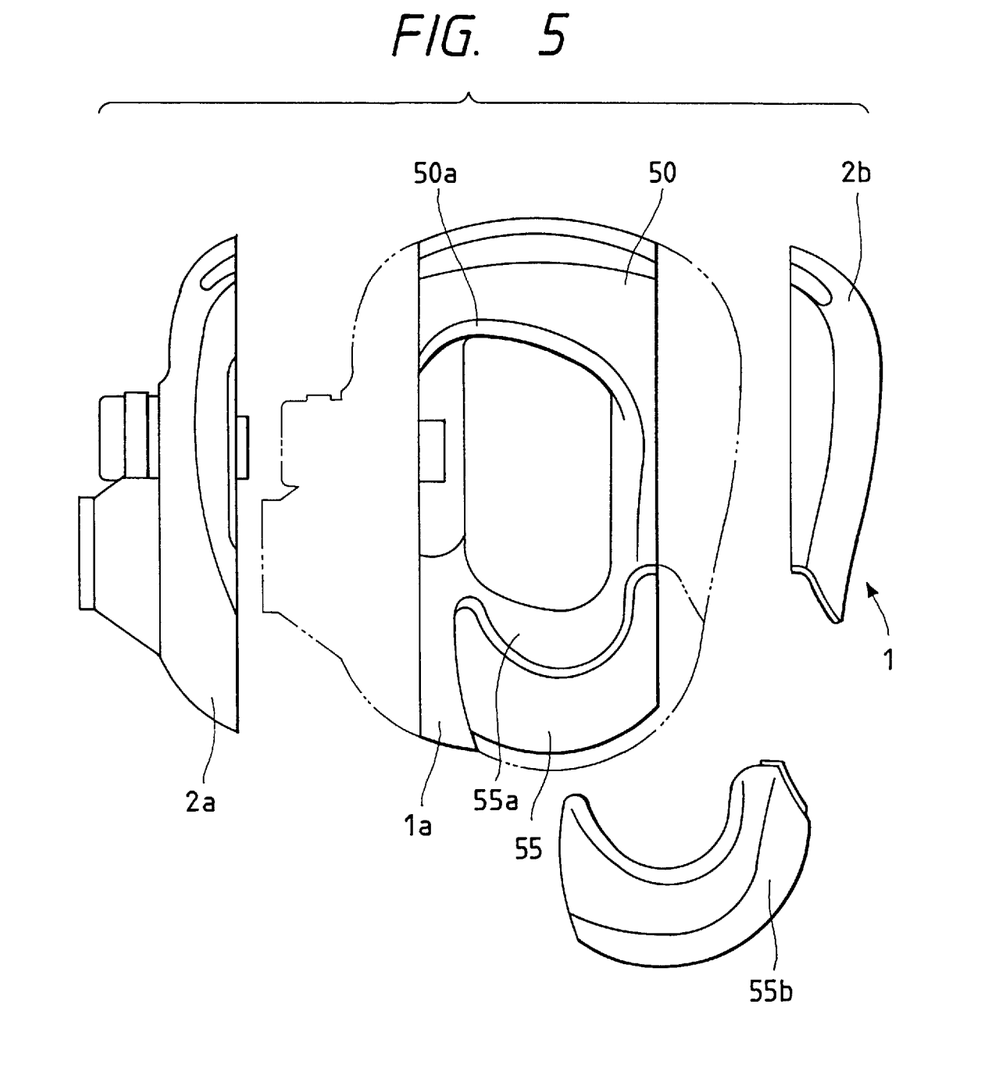
FIG. 5 is an exploded plan view of the fishing reel shown in FIG. 1.

As shown in FIGS. 2 through 4, the side board 2b (on the opposite side) is tapered in the direction of height from the spool mounting region towards the rear end thereof. In the conventional side board (on the opposite side) as disclosed by the aforementioned Japanese Utility Patent (OPI) No's 21262/1992 and 117576/1992, the side board is substantially in the form of an arc formed around the spool shaft, and therefore the outer cylindrical portion of the side board abuts against the angler's palm, which makes it rather difficult for the angler to grip the side board deep with the palm. On the other hand, in the embodiment of the invention, the side board 2b is tapered towards the rear end from the spool mounting region as was described above, which makes it possible for the angler to hold the reel body deep within the palm. Hence, when the angler places the thumb on the finger placing sections 50 and 55, he can hold the side board 2b deep within the palm as viewed in the direction of height.

A preferable range of taper of the side board in the embodiment, will be concretely described with reference to FIG. 2.

In FIG. 2, reference character h1 designates the height of the side board 2b measured at the spool shaft center O; h2 designates, the height of the side board 2b is measured at a position which is located behind the spool shaft center O by a distance. In this case, when $l=0.6\times h1$, the ratio h2/h1 is in a range of from 10% to 90%. This is based on the following reason: If the ratio h2/h1 is larger than 90%, then the thickness of the side board 2b as viewed in the direction of height is increased, and therefore the hand may get tired of holding the reel when it holds the reel for a long time, thereby rendering it rather laborious to grip the reel with the hand. On the other hand, if the ratio h2/h1 is smaller than 10%, then the holding range of the reel rear end portion is small, and therefore it is rather difficult for the angler to hold the reel body with the palm. Accordingly, due to difficultly in controlling the spool with the thumb, the fishing reel is low in operability.

As shown in FIG. 1, the outer surface of the side board 2b (on the opposite side) is inclined backwardly, and tapers in the direction of width from the spool mounting region towards the rear end of the reel body 1. The side board 2b thus formed can be held deep with the palm not only in the direction of height but also in the direction of width. A preferable range of taper of the side board 2b as viewed in the direction of width is as follows: In FIG. 1, reference numeral W1 designates the distance between the side boards 2a and 2b measured along the spool shaft; and W2designates, the width measured at a position which is located behind the spool shaft by a distance L. In this case, when $L=0.5\times W1$, then the ratio W2/W1 is set in a range of from 15% to 90%. This is based on the following reason: If the ratio W2/W1 is smaller than 15%, then it becomes difficult to positively hold the reel with the thenar region of the thumb. If the ratio is larger than 90%, then it becomes rather difficult to hold the whole reel with the palm, and to control the spool with thumb whereby, the fishing reel becomes low in operability.

The outer surface of the side board 2b (on the opposite side) may be so shaped that it gradually decreases in width as viewed in both the upward direction and in the downward direction relative to a center line (i.e., towards both the upper end and the lower end) from the spool mounting region. The outer surface of the side board 2b thus shaped is substantially oval. Hence, as is seen from FIG. 3, it is shaped to allow the angler to hold the lower portion of the side board with the index finger. That is, the angler can hold the whole reel body deep with the palm by using the index finger and the thumb.

The configurations of the side board 2b (on the opposite side) as viewed in the direction of height, in the width direction, and in the upward and downward directions may be applied to an ordinary double-bearing type fishing reel without formation of the front finger-placing section 50 and the rear finger-placing section 55. The ordinary double-bearing type fishing reel thus modified is improved in reel gripping characteristic. Furthermore, the side board may be tapered (or made gradually smaller in width) only in one of the above-described directions. Even in this case, the double-bearing type fishing reel thus modified is improved in reel gripping characteristic. Alternatively, for the same effect, the side board may be modified such that, the side board is tapered only in one of the above-described directions, and the front finger-placing section 50 and the rear finger-placing section 55 are formed. When the side board is tapered, all that is necessary is that the tapering of the side board is started at the spool mounting region, and the side board is made gradually smaller in width towards the end. Hence, if the tapered side board is made somewhat uneven in the middle portion, it may help the angler grip the fishing reel.

While the preferred embodiments of the invention have been described, the invention is not limited thereto or thereby; that is, they may be changed or modified in various manners without departing from the spirit of the invention. For instance, the configurations of the front finger-placing section 50 and the rear finger-placing section 55 may be so modified that the opening defined by them is as shown in FIGS. 6A and 6B.

Figure 6A:
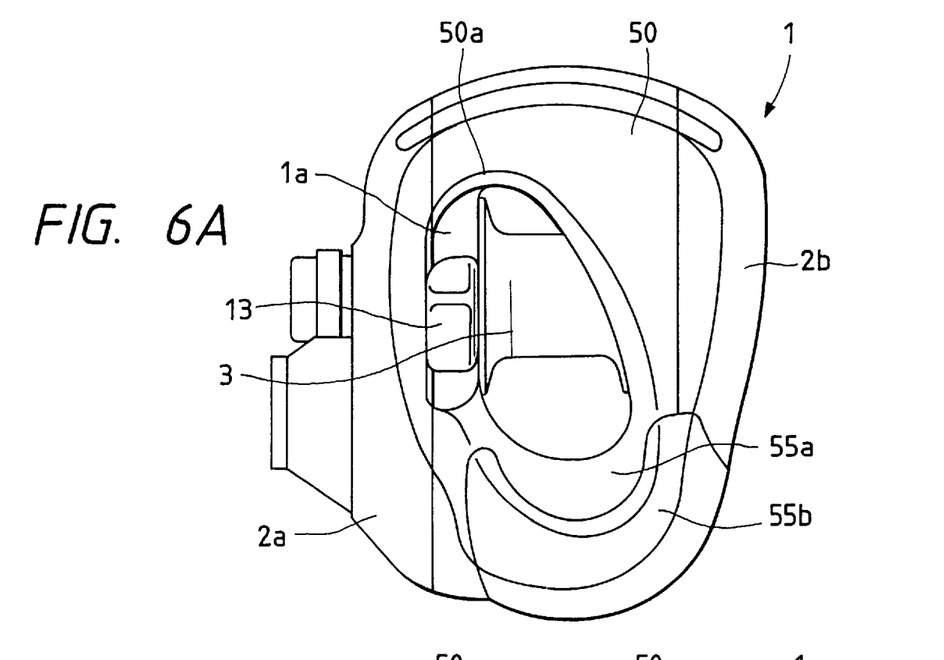
FIGS. 6A and 6B are plan views showing modifications of the double-bearing type fishing reel shown in FIG. 1.

FIG. 6A shows one such modification. In the modification, the front finger-placing section 50 and the rear finger-placing section 55 are designed so that the opening is substantially similar in configuration to the thumb placed thereon. With the modification thus designed, the thumb may be stably positioned on the finger-placing sections 50 and 55. Hence, the angler can achieve a casting operation stably while holding the reel body positively.

Figure 6B:
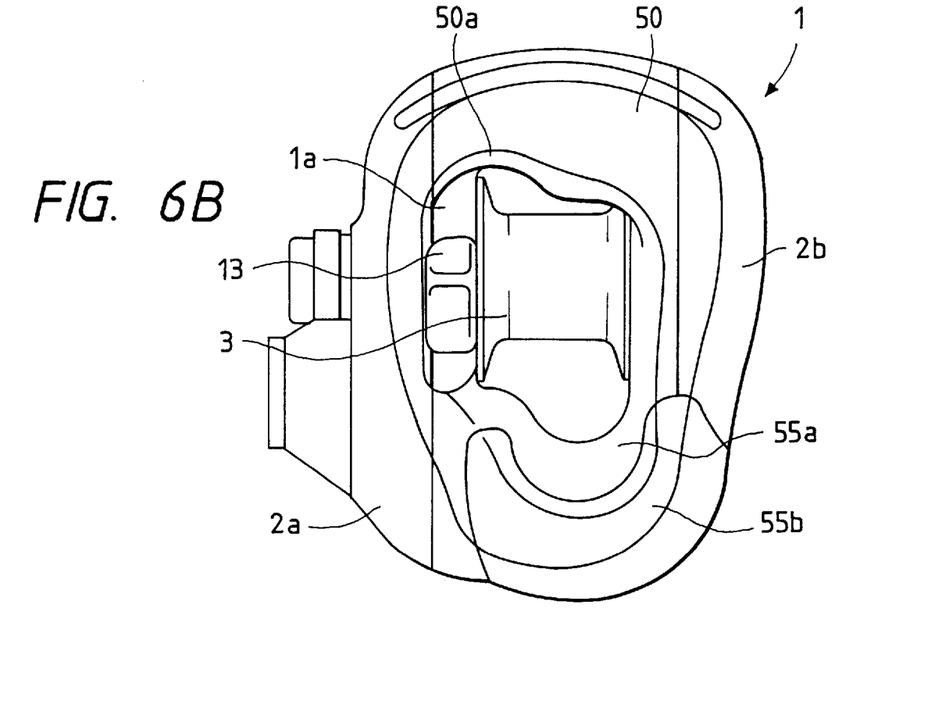

FIG. 6B shows another modification. In the modification, the front finger-placing section 50 is so designed that the opening extends further towards the side which is opposite to the side where the handle is provided. With the modification thus designed, the thumb is stably positioned on the finger-placing sections. And since the opening is large, the thumbing operation can be achieved with ease.

As was described above, the double-bearing type fishing reel of the invention allows the angler to positively grip the reel body deep with the palm. This feature makes it possible for the angler to stably let the fishing line out or take it up, and to strike a fish quickly when it takes the hook.

What is claimed is:

1. A double-bearing fishing reel comprising:

a spool;

a first side board provided on a first side of said spool, and a second side board provided on a second side of said spool opposite the first side, whereby said spool is supported between said first and second side boards so as to rotate about a transversely extending spool axis;

a front finger-placing section provided between said first and second side boards and at least predominantly above said spool and forward of the spool axis, wherein said front finger-placing section is formed generally for receiving a distal portion of a thumb; and a rear finger-placing section provided between said first and second side boards and at least predominantly behind said spool, wherein said rear finger-placing section is formed generally for receiving a base portion of the thumb;

wherein a lengthwise imaginary line segment extends between at least one lengthwise extremity of one of said first and second side boards and an opposite terminus of said one side board, and passes through the spool axis, and wherein the spool axis is located forward of an imaginary point bisecting the lengthwise imaginary line segment into two equal segment halves.

2. A double-bearing fishing reel according to claim 1, further comprising:

a handle provided adjacent to said first side board such that said first side board is located between said handle and said spool;

wherein said second side board tapers in height such that the height, measured transversely to the lengthwise imaginary line segment, decreases along the lengthwise imaginary line segment from a point of intersection with the spool axis to a rear terminus of said second side board located behind said spool.

3. A double-bearing fishing reel according to claim 2, wherein:

$$0.1 \leq h_2/h_1 \leq 0.9$$

where: $h_1$ is the height of said second side board at the point of intersection with the spool axis, $h_2$ is the height of said second side board at a further imaginary point on the lengthwise imaginary line segment that is located a distance l behind the point of intersection with the spool axis in a direction of the rear terminus, and $$l=0.6 \times h_1.$$

4. A double-bearing fishing reel according to claim 1, further comprising:

a handle provided adjacent to said first side board such that said first side board is located between said handle and said spool;

wherein said second side board is inclined towards said first side board such that a transverse distance between said first and second side boards decreases along the lengthwise imaginary line segment from a point of intersection with the spool axis to a rear terminus of said second side board located behind said spool.

5. A double-bearing fishing reel according to claim 4, wherein:

$$0.15 \leq W_2/W_1 \leq 0.90$$

where: $W_1$ is the transverse distance between said first and second side boards at the point of intersection with the spool axis, $W_2$ is the transverse distance between said first and second side boards at a further imaginary point on the lengthwise imaginary line segment that is located a distance L behind the point of intersection with the spool axis in a direction of the rear terminus, and $$L=0.5 \times W_1.$$

6. A double-bearing fishing reel according to claim 1, wherein:

said front finger-placing section comprises a first thumb-holding portion that is inclined inwardly generally in a direction toward said spool, wherein said first thumb-holding portion is formed generally for receiving the distal portion of the thumb; and said rear finger-placing section comprises a second thumb-holding portion that is inclined inwardly generally in a direction toward said spool, wherein said second thumb-holding portion is formed generally for receiving the base portion of the thumb.

7. A double-bearing fishing reel according to claim 1, wherein:

said front finger-placing section comprises a first arcuate perimeter;

said rear finger-placing section comprises a second arcuate perimeter located generally opposite said first arcuate perimeter across said spool; and said first and second arcuate perimeters, in conjunction with said first and second side boards, define an opening generally above said spool, which opening is substantially in the form of an oval.

8. A double-bearing fishing reel according to claim 7, wherein:

said first and second arcuate perimeters respectively have a first and a second point together defining a largest diameter of the oval; and an imaginary line connecting the first and second points is inclined with respect to an imaginary plane extending in directions orthogonal to the spool axis.

9. A double-bearing fishing reel according to claim 7, wherein:

said first and second arcuate perimeters are asymmetric with respect to an imaginary plane extending in directions orthogonal to the spool axis and intersecting a midpoint of the spool axis.

10. A double-bearing fishing reel according to claim 1, further comprising:

a handle mounted adjacent to said first side board so as to rotate about a transversely extending handle axis, whereby said first side board is located between said handle and said spool;

wherein the spool axis is located forward of the handle axis.

11. A double-bearing fishing reel according to claim 1, wherein:

said rear finger-placing section comprises a cover made of elastic material and formed generally for receiving the base portion of the thumb.

12. A double-bearing fishing reel comprising:

a spool;

a first side board provided on a first side of said spool, and a second side board provided on a second side of said spool opposite the first side, whereby said spool is supported between said first and second side boards so as to rotate about a transversely extending spool axis;

a handle provided adjacent to said first side board such that said first side board is located between said handle and said spool;

a front finger-placing section provided between said first and second side boards and at least predominantly above said spool and forward of the spool axis, wherein said front finger-placing section is formed generally for receiving a distal portion of a thumb; and a rear finger-placing section provided between said first and second side boards and at least predominantly behind said spool, wherein said rear finger-placing section is formed generally for receiving a base portion of the thumb;

wherein:

said front finger-placing section comprises a first arcuate perimeter, and said rear finger-placing section comprises a second arcuate perimeter located generally opposite said first arcuate perimeter across said spool;

said first and second arcuate perimeters, in conjunction with said first and second side boards, define an opening generally above said spool, which opening is substantially in the form of an oval;

said first and second arcuate perimeters are asymmetric with respect to an imaginary plane extending in directions orthogonal to the spool axis and intersecting a midpoint of the spool axis;

said first and second arcuate perimeters respectively have a first and a second point together defining a largest diameter of the oval; and an imaginary line connecting the first and second points is inclined with respect to an imaginary plane extending in directions orthogonal to the spool axis such that the first point is located between said first side board and the imaginary plane, while the second point is located between the imaginary plane and said second side board.

13. A double-bearing fishing reel according to claim 12, wherein:

said front finger-placing section further comprises a first thumb-holding portion that is inclined inwardly generally in a direction toward said spool, wherein said first thumb-holding portion is formed generally for receiving the distal portion of the thumb; and said rear finger-placing section further comprises a second thumb-holding portion that is inclined inwardly generally in a direction toward said spool, wherein said second thumb-holding portion is formed generally for receiving the base portion of the thumb.

14. A double-bearing fishing reel according to claim 12, wherein:

said handle is mounted adjacent to said first side board so as to rotate about a transversely extending handle axis, whereby said first side board is located between said handle and said spool; and the spool axis is located forward of the handle axis.

15. A double-bearing fishing reel according to claim 12, wherein:

said rear finger-placing section comprises a cover made of elastic material and formed generally for receiving the base portion of the thumb.

16. A double-bearing fishing reel comprising:

a spool;

a first side board provided on a first side of said spool, and a second side board provided on a second side of said spool opposite the first side, whereby said spool is supported between said first and second side boards so as to rotate about a transversely extending spool axis;

a handle provided adjacent to said first side board such that said first side board is located between said handle and said spool;

a front finger-placing section provided between said first and second side boards and at least predominantly above said spool and forward of the spool axis, wherein said front finger-placing section is formed generally for receiving a distal portion of a thumb;

a rear finger-placing section provided between said first and second side boards and at least predominantly behind said spool, wherein said rear finger-placing section is formed generally for receiving a base portion of the thumb; and a rod-mounting section for securing a fishing rod to the fishing reel and provided between said first and second side boards and at least predominantly below said spool, said rod-mounting section extending from a front terminus to a rear terminus;

wherein:

a lengthwise imaginary line segment extends between at least one lengthwise extremity of one of said first and second side boards and an opposite terminus of said one side board, and passes through the spool axis;

said second side board tapers in height such that the height, measured transversely to the lengthwise imaginary line segment, decreases along the lengthwise imaginary line segment from a point of intersection with the spool axis to a rear terminus of said second side board located behind said spool;

said first side board, said second side board, said front finger-placing section, said rear finger-placing section, and said rod-mounting section together define a reel body;

said rear finger-placing section comprises a rear terminus of the reel body, whereby the rear terminus of the reel body is located behind the rear terminus of said rod-mounting portion;

said front finger-placing section comprises a first arcuate perimeter, and said rear finger-placing section comprises a second arcuate perimeter located generally opposite said first arcuate perimeter across said spool;

said first and second arcuate perimeters, in conjunction with said first and second side boards, define an opening generally above said spool;

said front finger-placing section inclines gradually and smoothly inwardly in a direction toward said spool and includes a first thumb-holding portion formed generally for receiving the distal portion of the thumb; and said rear finger-placing section inclines gradually and smoothly inwardly in a direction toward said spool and includes a second thumb-holding portion formed generally for receiving the base portion of the thumb.

17. A double-bearing fishing reel according to claim 16, wherein:

$$0.1 \leq h_2/h_1 \leq 0.9$$

where: $h_1$ is the height of said second side board at the point of intersection with the spool axis, $h_2$ is the height of said second side board at a further imaginary point on the lengthwise imaginary line segment that is located a distance l behind the point of intersection with the spool axis in a direction of the rear terminus, and $$l=0.6 \times h_1.$$

18. A double-bearing fishing reel according to claim 16, wherein said second side board is inclined towards said first side board such that a transverse distance between said first and second side boards decreases along the lengthwise imaginary line segment from the point of intersection with the spool axis to a rear terminus of said second side board located behind said spool.

19. A double-bearing fishing reel according to claim 18, wherein:

$$0.15 \leq W_2/W_1 \leq 0.90$$

where: $W_1$ is the transverse distance between said first and second side boards at the point of intersection with the spool axis, $W_2$ is the transverse distance between said first and second side boards at a further imaginary point on the lengthwise imaginary line segment that is located a distance L behind the point of intersection with the spool axis in a direction of the rear terminus, and $$L = 0.5 \times W_1.$$

20. A double-bearing fishing reel according to claim 16, wherein:

said first and second arcuate perimeters respectively have a first and a second point together defining a largest diameter of the oval; and an imaginary line connecting the first and second points is inclined with respect to an imaginary plane extending in directions orthogonal to the spool axis.

* * * * *